Jan. 30, 1923.

A. M. LOW.
SPRING WHEEL.
FILED MAY 13, 1920.

1,443,693.

Inventor
Archibald Montgomery Low
by his Attorney

Patented Jan. 30, 1923.

1,443,693

UNITED STATES PATENT OFFICE.

ARCHIBALD MONTGOMERY LOW, OF LONDON, ENGLAND.

SPRING WHEEL.

Application filed May 18, 1920. Serial No. 380,979.

*To all whom it may concern:*

Be it known that I, ARCHIBALD MONTGOMERY LOW, of London, England, a subject of the King of England, have invented certain new and useful Improvements in and Relating to Spring Wheels, of which the following is a specification.

This invention relates to spring wheels.

It has been previously proposed to support the rim or periphery either as whole or in part by means of a series of leaf or laminated springs peripherally around it and located between inner and outer wheel members, said springs being fastened either to the inner or outer portions of the wheel or to both.

The present invention has for its object the provision of a wheel which, whilst being more particularly of the solid rim type, is so sprung that the outer rim member can move relatively to the inner rim member and said rims can also rotate relatively to each other should such movement be necessary, and with the object of obtaining a wheel in which the springs do not have to receive support in any direction to stand lateral or excessive vertical shocks, according to the present invention the leaf or laminated springs which may be set in the inner or outer member of the wheel and press upon the outer or inner member, as the case may be, are supported or positioned by friction only with regard to both of said wheel members.

To retain said springs in proper position, they are, however, seated in recesses in the adjacent surface of one of the wheel members. The said springs can naturally be compressed in the direction of shock, but do not allow of side play, the width of the springs and of their bearing surfaces on the wheel members preventing or reducing such side-play to a minimum. Such springs if fully compressed require no buffers to prevent damage as with many known constructions and in addition to this latter feature, no lubrication is needed, the springs are easy to conceal, and the dust plates which may be used to cover in the spaces between the inner and outer rim portions of the wheel can also be used to hold the tyre or a detachable or divisible rim or the like in position.

It is well known that such construction does not in any way compare with pneumatic or similar resilient springing, but it has advantage in preventing certain classes of vehicles from receiving unnecessary shocks.

Figure 1:
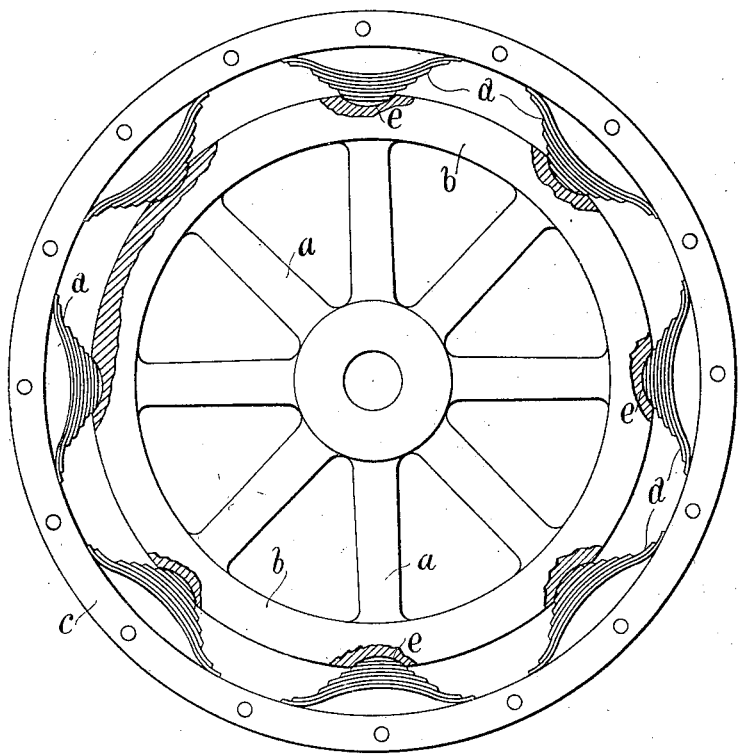
Figure 2:
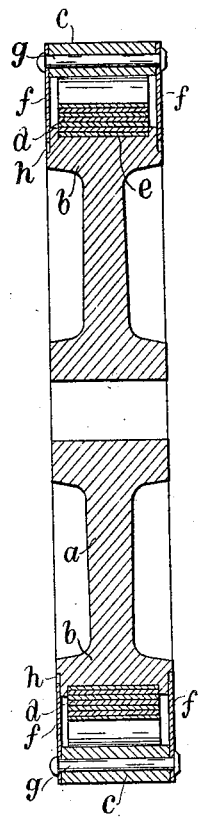

An embodiment of the invention given as example only is illustrated in the accompanying drawings, in which Fig. 1 is a side elevation partly in section with parts broken away with the aforesaid dust or enclosing plates removed, and Fig. 2 is a vertical central section of Fig. 1 with said plates in position. In said drawings, *a* designates the inner member of the wheel with its rim *b*, and *c* the outer separate rim member. Disposed between said two members is the series of leaf or laminated springs *d* equally spaced around the periphery, said springs being set or seated in recesses *e* formed in the outer surface of the inner member and bearing freely with their outer ends on the inner surface of the outer rim member. No positive connection whatever is made between the springs and the wheel members, the former retaining their position by friction whereby a certain amount of relative rotative movement between the wheel members may be permitted if required. The provision of the laminated or leaf springs and the width of their bearing surfaces on the wheel members tends to prevent or reduce to a negligible minimum any tendency to side play or lateral movement between the wheel members. As shown in Fig. 2 the space between the outer and inner wheel members may be enclosed by plates *f* for exclusion of dust or the like, said plates being shown as secured by bolts *g* to the outer rim *c* and working freely in recesses *h* in the sides of the inner rim *b* to provide for relative vertical movement between said rims due to compression of the springs. These plates may if required be formed to receive or hold a tyre of any kind or a detachable or divisible rim as previously mentioned.

I do not limit myself to the exact construction or arrangement of parts above described or shown in the drawings, since the same may be varied within limits prescribed by the appended claims without departing from the spirit of the invention.

What I claim as my invention and desire to secure by Letters Patent of the United States is:—

1. A spring wheel embodying inner and outer rim members spaced apart by a plurality of laminated leaf springs positioned intermediate said members, each spring being in width substantially equal to the width of said members and unattachably seated intermediate its ends in a transverse pocket in one of the members with its free ends firmly and unattachably bearing against the smooth and uninterrupted circumference of the other member, whereby the driving of the outer member from the inner member is dependent entirely on friction between the springs and said members.

2. A spring wheel embodying an inner rim member provided at spaced distances about its circumference with pockets which are transversely substantially flat, and outer rim member spaced from the inner rim member and provided with a smooth and uninterrupted inner circumference and a plurality of laminated leaf springs, one of which is seated intermediate its ends in each of said pockets which are circumferentially shaped to substantially conform with the portion of the springs which they receive, said springs being maintained in position under tension and without the employment of extraneous attaching means.

3. A spring wheel embodying inner and outer rim members spaced apart by relatively wide laminated leaf springs, each of which springs firmly and unattachably bears at its ends against the smooth, arcuate inner circumference of the outer rim member and is unattachably seated intermediate its ends in a pocket in the outer circumference of the inner rim member, the intermediate portions of the springs and the pockets in which they seat, being shaped to preclude lateral tilting of the springs, whereby attaching means for precluding shifting or tilting of the springs are rendered unnecessary.

In witness whereof I have signed this specification in the presence of two witnesses.

ARCHIBALD MONTGOMERY LOW.

Witnesses:
 WM. J. BRAKES,
 W. G. SHEARS.